(12) United States Patent
Nishikawa

(10) Patent No.: US 7,877,292 B2
(45) Date of Patent: Jan. 25, 2011

(54) MERCHANDISE SALES DATA PROCESSING APPARATUS

(75) Inventor: Hiroshi Nishikawa, Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 1264 days.

(21) Appl. No.: 11/260,869

(22) Filed: Oct. 27, 2005

(65) Prior Publication Data

US 2006/0095330 A1    May 4, 2006

(30) Foreign Application Priority Data

Oct. 29, 2004  (JP) ............. 2004-315198

(51) Int. Cl.
*G06Q 20/00* (2006.01)
*G07G 1/00* (2006.01)

(52) U.S. Cl. ............. 705/16; 235/7 R; 235/12

(58) Field of Classification Search ............. 705/16; 235/7 R, 12
See application file for complete search history.

(56) References Cited

U.S. PATENT DOCUMENTS

| | | | |
|---|---|---|---|
| 4,688,174 A | | 8/1987 | Sakamoto |
| 5,113,435 A | * | 5/1992 | Chen ............. 379/441 |
| 5,233,167 A | * | 8/1993 | Markman et al. ............. 235/375 |
| 5,659,603 A | * | 8/1997 | Orlofsky ............. 379/157 |
| 5,727,162 A | | 3/1998 | Nakamura |
| 5,781,619 A | * | 7/1998 | Kong ............. 379/100.14 |
| 6,207,907 B1 | * | 3/2001 | Gillig et al. ............. 200/5 A |
| 6,505,980 B1 | * | 1/2003 | Allday ............. 400/61 |
| 2002/0185029 A1 | | 12/2002 | Spano |
| 2003/0161672 A1 | * | 8/2003 | Roberson ............. 400/490 |
| 2004/0049427 A1 | * | 3/2004 | Tami et al. ............. 705/24 |
| 2004/0053648 A1 | * | 3/2004 | Gremo et al. ............. 455/575.1 |
| 2004/0112236 A1 | | 6/2004 | Yokoyama et al. |
| 2005/0000787 A1 | * | 1/2005 | Rix et al. ............. 200/512 |

FOREIGN PATENT DOCUMENTS

| | | |
|---|---|---|
| EP | 0 720 134 A2 | 7/1996 |
| EP | 1 394 753 A1 | 3/2004 |
| JP | 57-060286 U | 4/1982 |
| JP | 1-251294 A | 10/1986 |
| JP | 2000-020223 A | 1/2000 |

OTHER PUBLICATIONS

Advanced Input Devices unveils 101 style Panelkey (TM) keyboard for use in hostile environments. News Release, p. 1. Nov. 16, 1989 (Retrieved using Dialog QuickSearch on Sep. 15, 2010).*
New Logitech Keyboard Designs Place Premium on Comfort and the Digial Media Experience. Business Wire, Jul. 20, 2004 (Retrieved using Dialog Quicksearch on Sep. 15, 2010).*

(Continued)

*Primary Examiner*—Matthew S Gart
*Assistant Examiner*—Scott A Zare
(74) *Attorney, Agent, or Firm*—Patterson & Sheridan, LLP

(57) ABSTRACT

A receipt issuance facility included in a receipt printer incorporated in a merchandise sales data processing apparatus is utilized in order to print a role assigned to a key together with a frame matched with the size of the key.

8 Claims, 8 Drawing Sheets

OTHER PUBLICATIONS

European Patent Office Communication re: Summons to attend oral proceedings, dated Feb. 26, 2009, issued in counterpart European Application Serial No. 05023284.2-2221.

Japanese Office Action dated May 7, 2009 (2 pages), and partial English translation thereof (2 pages), issued in counterpart Japanese Application Serial No. 2004-315198.

* cited by examiner

MERCHANDISE SALES DATA PROCESSING APPARATUS

CROSS-REFERENCE TO RELATED APPLICATION

The present application is based on and claims the benefit of the priority of Japanese Patent Application P2004-315198 filed on Oct. 29, 2004, the entire contents of which are incorporated herein by reference.

BACKGROUND OF THE INVENTION

1. Field of the Invention

The present invention relates to a merchandise sales data processing apparatus such as an electric cash register (ECR) or a point-of-sale (POS) terminal.

2. Description of Related Art

Conventionally, merchandise sales data processing apparatuses including an ECR and a POS terminal that are installed at stores or the like include a keyboard which is composed of a plurality of keys. A user (hereinafter an operator) of the ECR or the like enters merchandise information on the keyboard. The keys arranged in the keyboard include, in addition to keys that serve as numeric keys, function keys such as arrow keys and department keys associated with commodity groups or commodity names. One role or two or more roles are assigned to the keys other than the numeric keys (hereinafter, roles signify not only functional roles but also names).

However, in this case, since the keyboard includes numerous keys, indicators are needed to distinguish what keys serves what roles.

An indication method for distinguishing roles relates to the structure of each key. In case of a structure that a key is devoid of a cover, indication is achieved by directly printing characters on the top of a key (key top) that is a surface of a key which is touched by an operator's finger. On the other hand, in case of a structure that a key is provided with a cover, a sheet of paper or the like is interposed between a key and a key cover in order to indicate a role assigned to the key.

The sheet of paper, which is interposed between a key and a key cover in order to indicate the role of the key, is called, for example, a key sheet or a key sticker (both of the key sheet and key sticker will be employed below). The key sheet should be remade every time a function or a commodity name assigned to the key is changed to another. Japanese Unexamined Patent Publication No. 2000-20223 (hereinafter, Patent Document 1) describes a proposed method of remaking the key sheet.

However, according to the invention proposed in Patent Document 1, the roles of all keys included in a keyboard are printed on one sheet of paper, and the sheet of paper is divided into key sheets. Therefore, for example, even if only one role of a key has been changed, it is necessary that new key sheets including all other keys which do not require any change must be re-printed. Since the sheet of paper to be divided into the key sheets indicates the roles of all keys and is therefore large in size, a dedicated printer must be adopted in order to print the large sheet of paper which is divided into the key sheets. This leads to an increase in the size of an ECR.

Moreover, according to the Patent Document 1, a random access memory (RAM) included in an ECR includes a special format memory that saves data representing a format that stipulates the contour of a key sheet and a manipulation field in the key sheet. A work area to be preserved in the RAM is therefore narrowed.

Furthermore, when the ECR proposed in the Patent Document 1 is not adopted, a key sticker must be modified manually. The key sticker must be formed in line with the size of each key. It is time consuming to measure the size of each key and inscribe a role within a frame drawn to be matched with the size of the key.

An object of the present invention is to provide a merchandise sales data processing apparatus that obviates the necessity of separately providing a printer which is used to print key stickers.

SUMMARY OF THE INVENTION

According to the present invention, a merchandise sales data processing apparatus is provided in which a receipt printer prints and issues a receipt. Merchandise sales processing including receipt issuance, which is performed by using the receipt printer, is performed according to received merchandise information. A keyboard is formed with a set of keys and has a data input ability. A key cover is freely attachable to or detachable from a key and holds a key sheet between itself and a key top. A name signifying a role assigned to the key is recorded on the key sheet. Predetermined roles to the keys are assigned. A memory unit preserves the predetermined roles assigned to the keys. The receipt printer is driven and controlled to print names which signify the roles of the keys stored in the memory unit together with frames that delineate respective key sheets on receipt paper.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

An embodiment of the present invention will be described in conjunction with FIGS. 1 to 8. The present embodiment is an example of a merchandise sales data processing apparatus adapted to, for example, an ECR.

Figure 1:
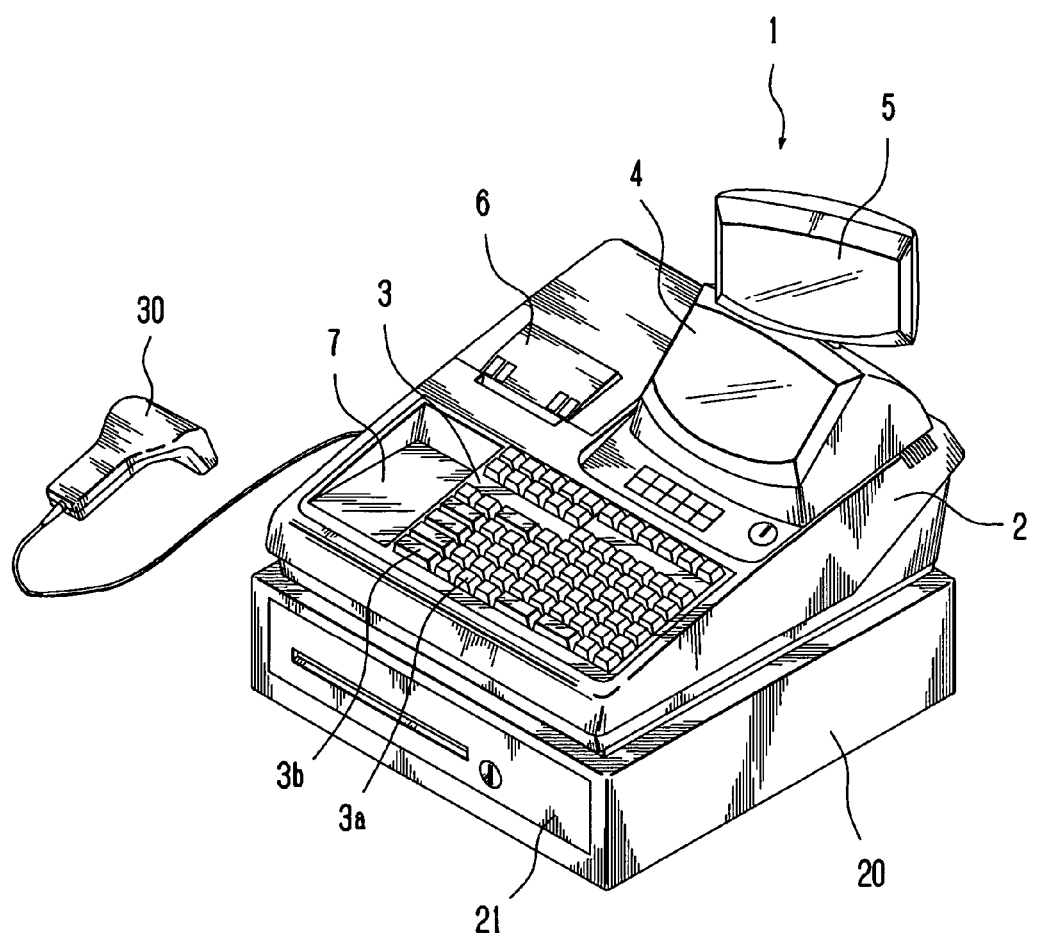
FIG. 1 is a schematic perspective view showing the whole of a merchandise sales data processing system including an ECR in accordance with an embodiment of the present invention.

FIG. 1 is a schematic perspective view showing the whole of a merchandise sales data processing system including an ECR 1 in accordance with the present embodiment. The ECR 1 includes a housing 2 and has components which is stored in the housing 2 or exposed to outside the housing 2. A keyboard 3, an operator display device 4, a shopper display device 5, a receipt issuance port 6, and a note rest 7, on which a note received from a shopper, is tentatively placed are arranged on the top of the housing 2. The operator display device 4 is disposed in front of an operator, and the keyboard 3 is located below the operator display device 4. The receipt issuance port 6 and the note rest 7 are disposed on the left parts of the operator display device 4 and keyboard 3 respectively. By the arrangement described above, an operator can easily enter merchandise information or the like. Moreover, the shopper display device 5 is located at a position higher than the position of the operator display device 4 so that a shopper can easily look at the shopper display device 5. A receipt printer 6a (see FIG. 2) that prints a receipt is stored in the housing 2.

The ECR 1 is mounted on a drawer unit 20 in which money and securities including checks received from shoppers are preserved. The drawer unit 20 has a drawer 21 which is pulled forward for settlement. Namely, money or the like received from a shopper is put in the drawer 21. A code scanner 30 that optically reads a commodity code or the like is connected to the ECR 1.

Figure 2:
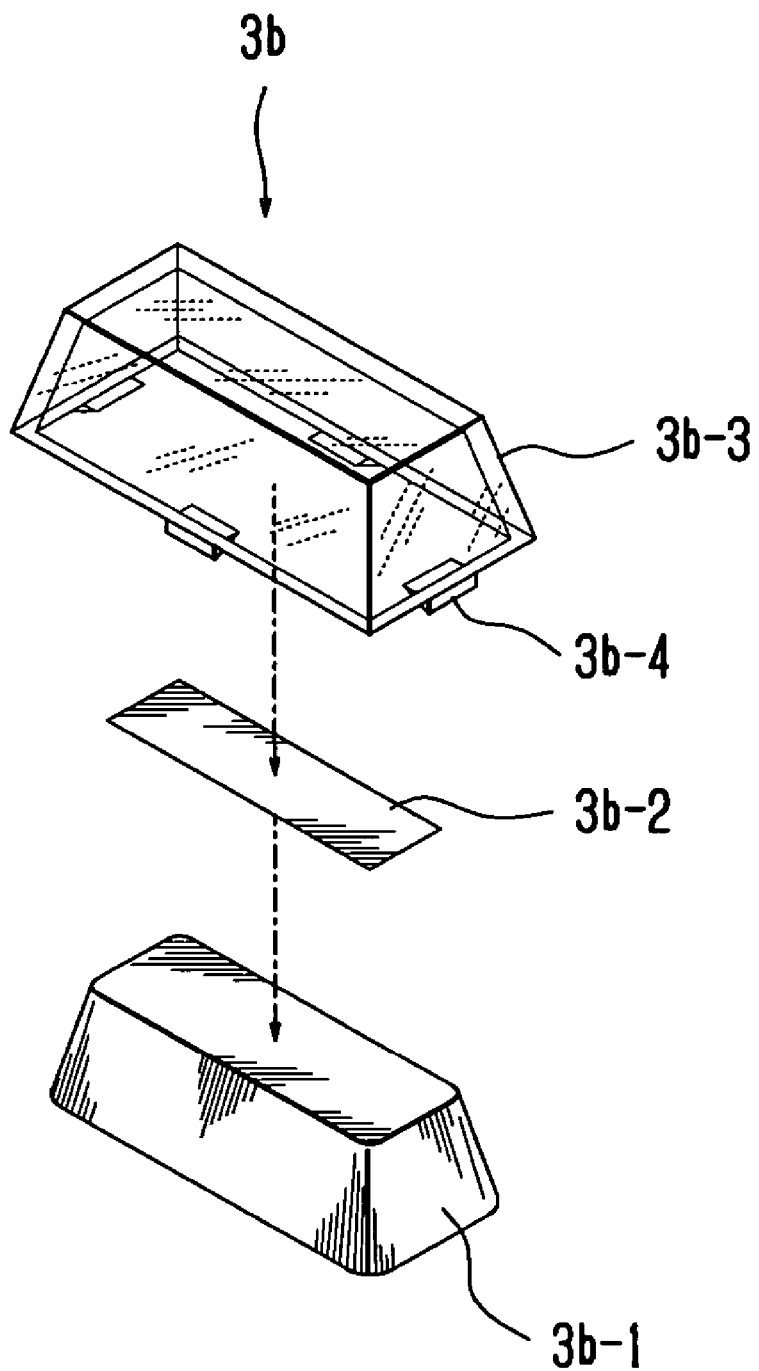
FIG. 2 is an exploded perspective view of a double key.

FIG. 2 is an exploded perspective view of a double key 3b. The keyboard 3 (FIG. 1) has numerous keys. The keys are classified into single keys 3a and double keys 3b in terms of their sizes. Now, the structure of a key will be described by taking the double key 3b for instance.

The double key 3b is composed of a key body 3b-1, a key sticker (key sheet) 3b-2, and a key cover 3b-3. The key sticker 3b-2 is made of, for example, paper and indicates a role assigned to the key. The key cover 3b-3 is made of a transparent resin or the like, for example, a plastic so that the key sticker 3b-2 can be seen through the key cover.

The key sticker 3b-2 is placed on the top of the key body 3b-1, and is enclosed together with the key body 3b-1 by the key cover 3b-3. In other words, the key sticker 3b-2 is sandwiched between the key body 3b-1 and the key cover 3b-3. The key cover 3b-3 has claws 3b-4 at the lower ends of the flanks thereof. The claws 3b-4 are hooked on to the lower ends of the flanks of the key body 3b-1, whereby the key cover is fixed to the key body 3b-1.

Figure 3:
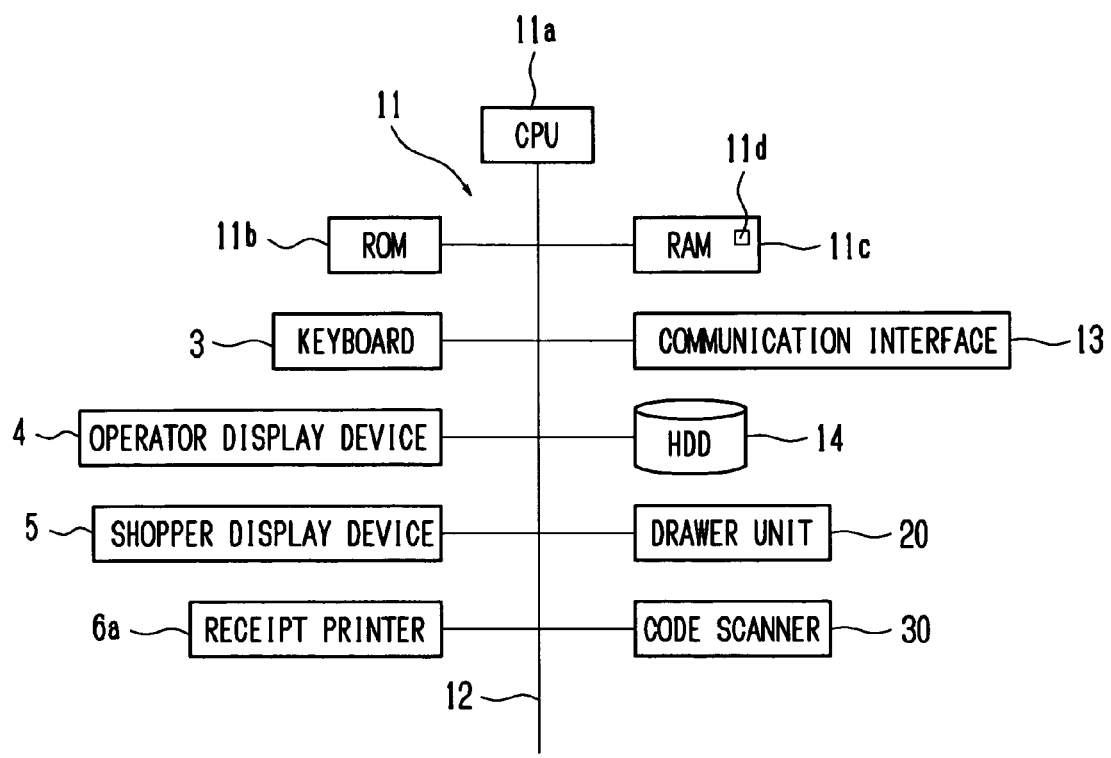
FIG. 3 is a block diagram showing electric connections of components of the ECR.

FIG. 3 is a block diagram showing electric connections of components included in the ECR 1. As shown in FIG. 3, the ECR 1 includes a control unit 11 composed of a central processing unit (CPU) 11a that performs various calculations and controls the components, a read-only memory (ROM) 11b in which computer programs or the like are saved, and a random access memory (RAM) 11c in which various kinds of data items are saved so that the data items will be freely rewritable. The RAM 11c serves as various work areas owing to the feature of keeping variable data items freely rewritable.

Moreover, the RAM 11c includes a key assignment memory 11d. Pieces of information on roles assigned to the respective keys and pieces of information on the sizes of the keys are stored in the assignment memory 11d. Moreover, for example, when a role different from a conventionally assigned role is assigned to a keys, information on the newly assigned role is stored.

The keyboard 3, the operator display device 4, the shopper display device 5, the printer 6a, a communication interface 13 that communicates data to or from external electronic equipment such as a host computer that is not shown, the drawer unit 20, and the code scanner 30 are connected to the control unit 11 via a bus line 12. Moreover, a hard disk drive (HDD) 14, in which control programs that instruct the control unit 11 to perform actions and a merchandise master file are saved, is also connected to the control unit 11 via the bus line 12.

Figure 4:
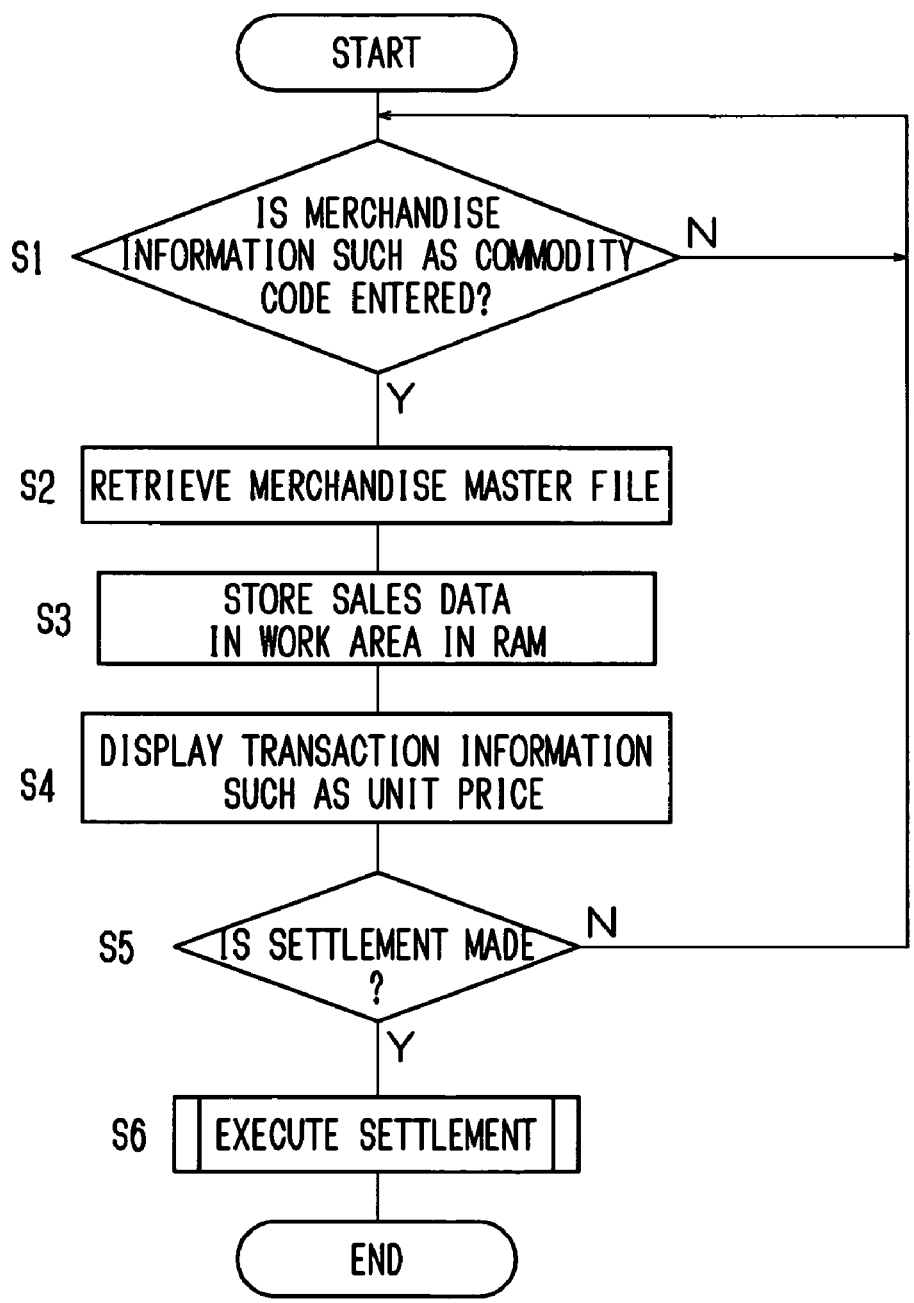
FIG. 4 is a flowchart outlining merchandise sales data processing to be executed by a control unit included in the ECR.

FIG. 4 is a flowchart outlining merchandise sales data processing to be executed by the control unit 11 included in the ECR 1. The merchandise sales data processing will be briefed in conjunction with FIG. 4.

For the merchandise sales data processing, first, a standby state is established in order to wait for input of merchandise information such as a commodity code or the number of sold commodities from an input means such as the keyboard 3 or code scanner 30 (S1). If input of merchandise information from the input means is recognized (Yes at step S1), the merchandise sales data processing is executed. During the merchandise sales data processing, the merchandise master file is retrieved from the RAM 11e according to received commodity codes (S2). Sales data specifying a commodity name, a unit price, and a department code is stored in a work area in the RAM 11c (S3). Information on a transaction such as a unit price stored in the work area in the RAM 11c is displayed on the operator display device 4 and the shopper display device 5 (S4).

The processing from steps S1 to S4 is repeated until depression of, for example, a deposit/cash payment key included in the keyboard 3 is identified and declaration of settlement is recognized (Yes at step S5). If the depression of, for example, the deposit/cash payment key included in the keyboard 3 is identified and declaration of settlement is recognized (Yes at step S5), settlement is executed at step S6. The sales data items are stored in a sales memory. If the settlement is executed, the merchandise sales data processing is terminated.

Figure 5:
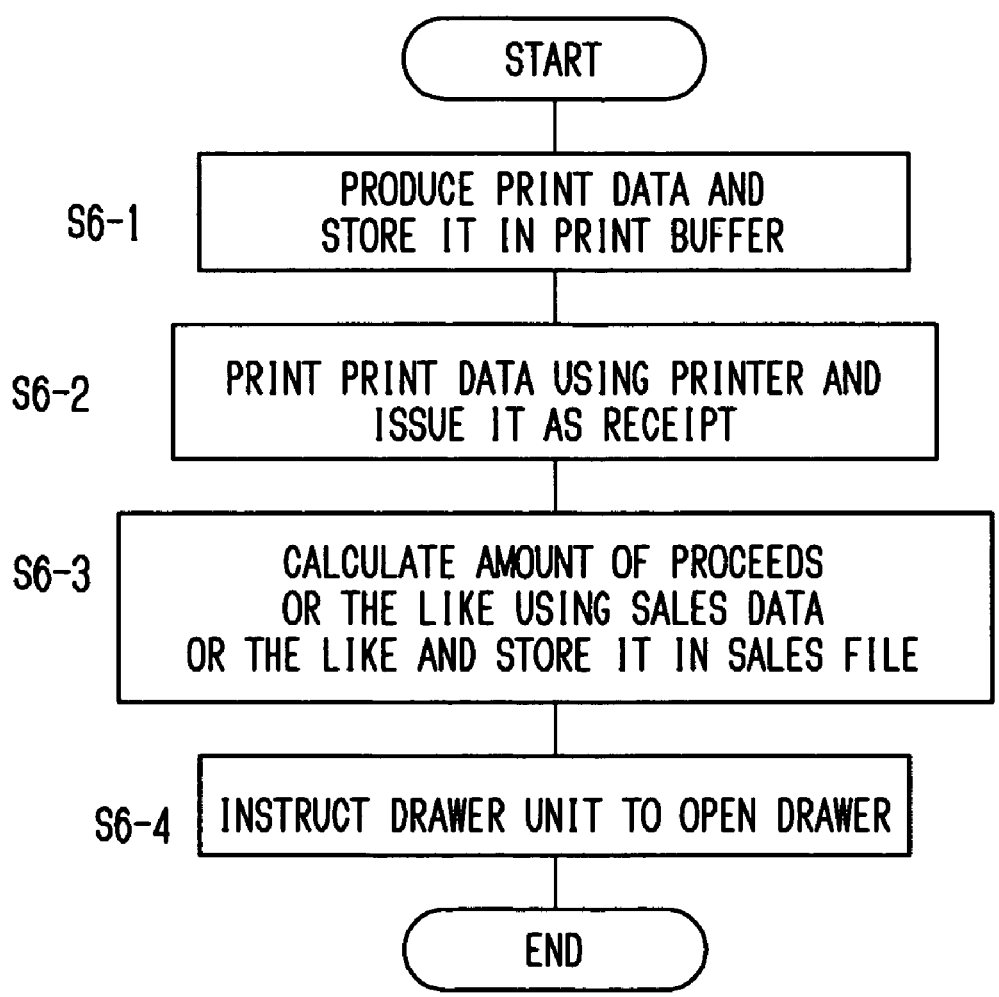
FIG. 5 is a flowchart describing a flow of settlement.

FIG. 5 is a flowchart describing a flow of settlement. Next, the settlement will be described in conjunction with FIG. 5.

If the deposit/cash payment key that serves as a settlement key is pressed (S5), print data containing the sales data items stored in the sales memory and specifying the amount of consumption taxes calculated based on the sales data items and an aggregate amount of proceeds is produced and stored in a print buffer (S6-1). The print data is printed on a receipt by the printer 6a and issued through the receipt issuance port 6 (S6-2). Moreover, the sales data stored in the sales memory is used to calculate, for example, an amount of proceeds, a volume of sales per commodity, and the number of shoppers. The results of the calculation are stored in a sales file recorded in the HDD 14 (S6-3).

Thereafter, a drawer open signal is transmitted to the drawer unit 20 in order to open the drawer 21 (S6-4). In response to the signal, the drawer 21 is opened.

Figure 6:
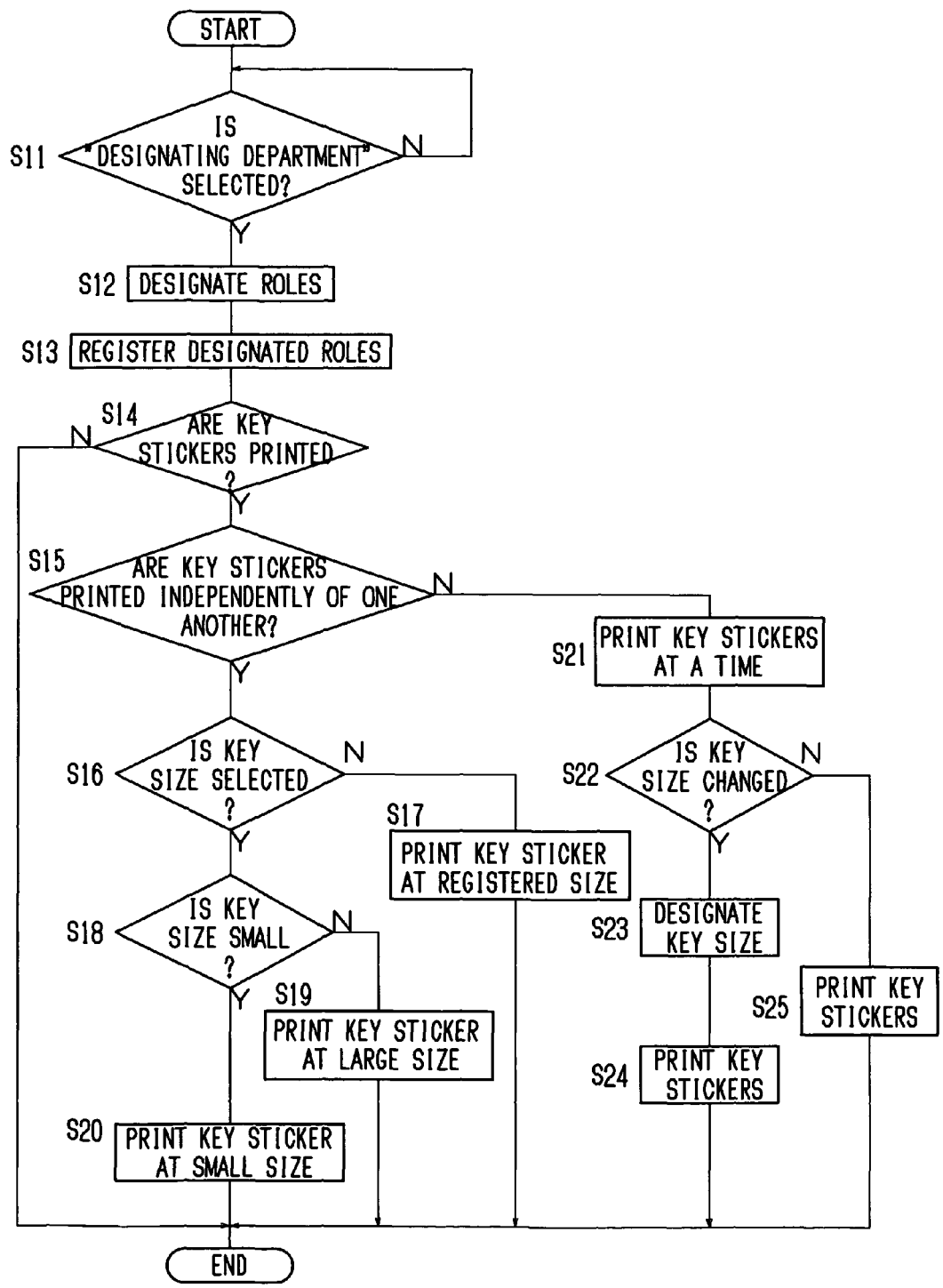
FIG. 6 is a flowchart describing a designation procedure for assigning certain roles to keys included in a keyboard.

FIG. 6 is a flowchart describing a designation procedure for assigning certain roles to keys included in the keyboard 3.

An operator assigns roles to keys by referring to characters or the like displayed on the operator display device 4. First, the ECR 1 is set to a designation mode, and a designation procedure is initiated. The ECR 1 supports various designation items. An item "Designating a department" is selected from the items (S11). The keys include keys whose roles are designated in advance and keys whose roles are not designated initially and to which a user of the ECR 1 assigns roles. An operator selects keys to which roles will be assigned, and assigns the roles to the keys. Since the designation procedure may be different in different ECR models, the details of the designation procedure will be omitted. Anyhow, the roles of keys are designated (S12). After roles of keys are designated, the contents of the designation are registered in the RAM 11d (S13). Consequently, roles which an operator has intended are assigned to keys.

After roles are assigned to keys, whether the assigned roles are printed in order to produce key stickers 3b-2 is determined (S14). Display items supported by the operator display device 4 include, for example, an item "Printing key stickers." When the item is selected, printing work is initiated (Yes at step S14). If printing need not be performed (No at step S14), designation work is terminated. If printing key stickers is selected (Yes at step S14), whether the key stickers are printed independently of one another is determined (S15). To print key stickers independently of one another, an operator selects a key, for which a key sticker is printed, from the keys to which roles are assigned, and the key sticker is then printed. If printing key stickers independently of one another is not selected (No at step S15), key stickers for all the keys to which roles have been assigned during designation work are printed at a time (S21).

If independent printing is performed (Yes at step S15), the size of a key is designated (S16). The keys are available in two sizes. Namely, the keys fall, as shown in FIG. 1, into single keys 3a and double keys 3b. This is intended to allow an operator to select either of the key sizes according to the operator's use environment or the like, for example, to allow an operator to assign a role, which has been assigned to a single key, to a double key. If either of the key sizes is selected (Yes at step S16), whether a key sticker is printed at the size of the single key (Yes at step S18) or at the size of the double key (No at step S18) is determined. Each of key stickers is printed at the selected key size (S19 and S20). If a role is assigned to a key whose size is the same as the size of a key to which the role has been assigned, a key sticker is printed at an already registered key size (S17).

On the other hand, if independent printing is not selected, key stickers for keys whose roles have been designated are printed at a time (S21). In this case, the size of key stickers to be printed may be changed along with a key size (S22). If the size of key stickers to be printed is changed (Yes at step S22), a key size is selected (S23) and key stickers are then printed (S24). In particular, if the size of key stickers is not changed (S25), the key stickers are printed as they are.

The designation procedure for assigning certain roles to keys is completed.

Figure 7:
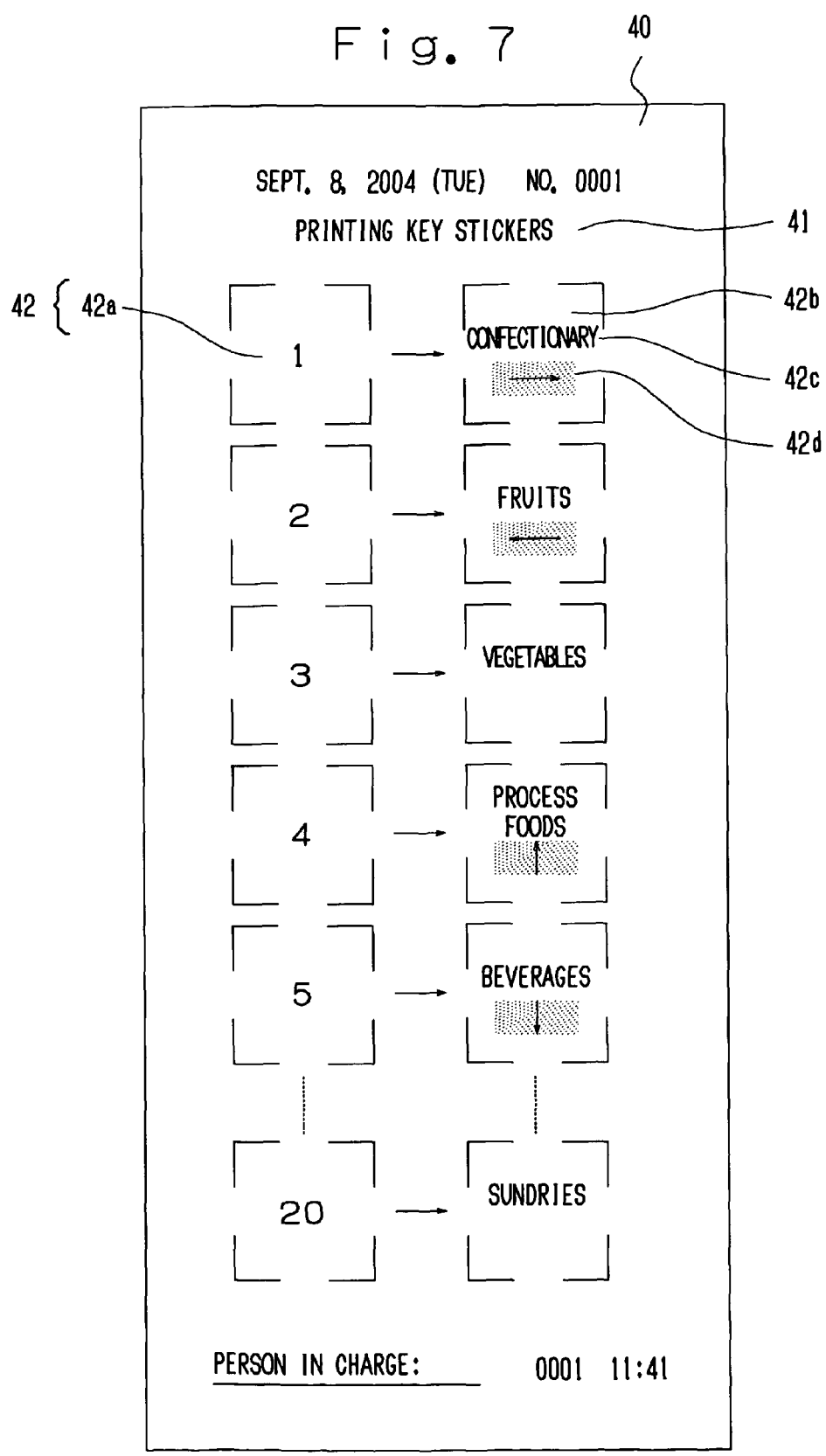
FIG. 7 illustratively shows the state of receipt paper on which roles assigned to single keys are printed.
Figure 8:
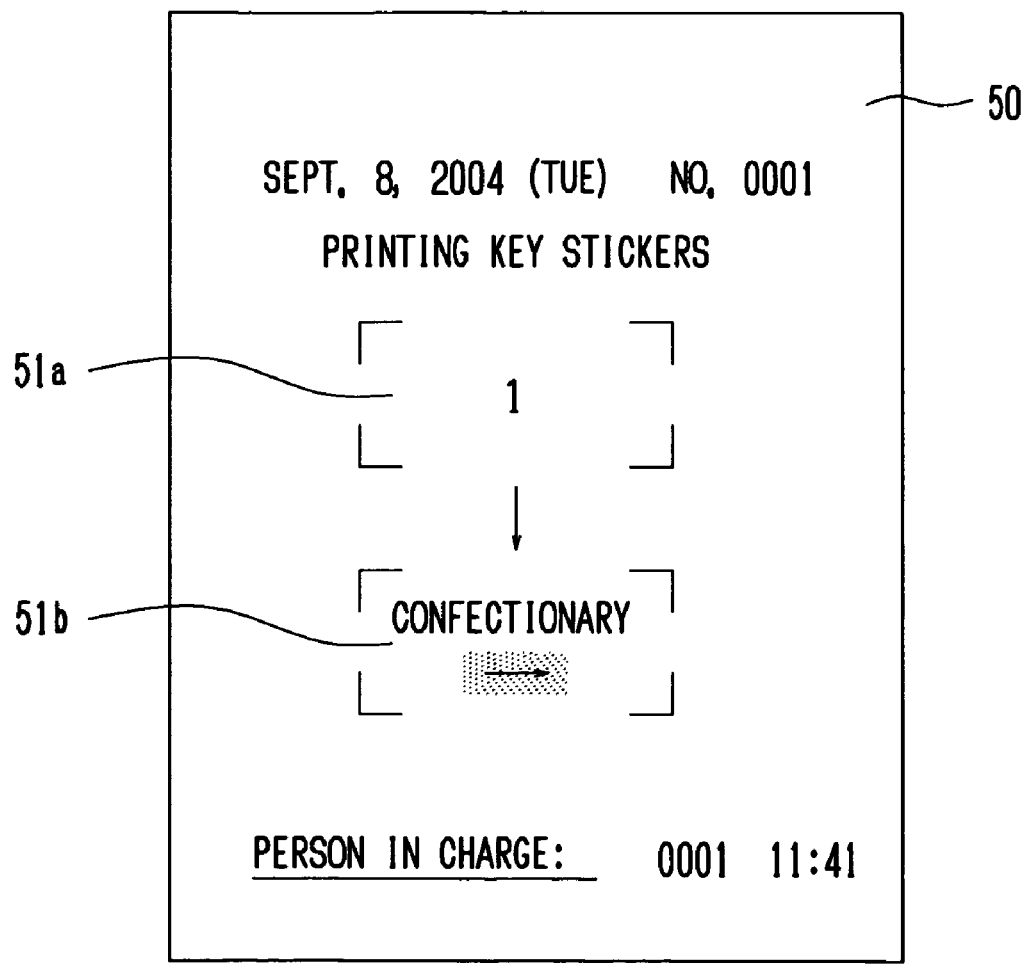
FIG. 8 illustratively shows the state of receipt paper on which a role assigned to a double key is printed.

FIG. 7 illustratively shows the state of receipt paper having roles assigned to single keys printed thereon. FIG. 8 illustratively shows the state of receipt paper having a role assigned to a double key printed thereon.

According to the present invention, the receipt printer 6a incorporated in the ECR 1 is used to print receipt paper 40 so as to produce key stickers 3b-2. A date and a time at which printing is performed, and so on, are printed on the upper and lower margins of the receipt paper 40. This is because an existing receipt printing facility is also used to print the key stickers 3b-2. Items inscribed in the receipt paper 40 will be described below.

Frames that are shaped substantially like squares are drawn by expressing four corners of each frame and are lined in two columns below a title 41 "Printing Key Stickers". The size of the frames is matched with the size of keys. Once the frames are cut apart, they can be used as key stickers 3b-2. The frames in the uppermost row among those lined in two columns will be taken for instance.

Two frames 42, that is, right and left frames are printed on the receipt paper 40. A left frame 42a printed on the left side acts as a key sticker used before a role is assigned to a key concerned. A numerical character printed within the left frame 42a, for example, 1 in this example specifies the position of the key concerned. Namely, a key associated with a numerical character alone is a key to which no role is assigned. Incidentally, instead of the numerical character specifying the position of a key, a concrete description of the position, for example, "in the xx-th row and the xx-th column" may be written in the left frame 42a on the print paper 40.

A right frame 42b printed on the right side acts as a key sticker used after a role is assigned to the key associated with the left frame 42a. The upper and lower parts of the right frame 42b are associated with two different roles. A role that is a name 42c such as "Confectionary" is associated with the upper part, while a functional role that is an arrow mark 42d such as a rightward arrow "→" is associated with the lower part. In the present embodiment, the arrow mark 42d associated with the lower part is drawn in a hatched background in order to avoid confusion of the arrow mark associated with the lower part with the name 42c associated with the upper part.

The upper and lower parts of a frame may not always be associated with two different roles. For example, as shown in FIG. 7, a frame located two frames below the frame 42 on the receipt paper 40, a name "Vegetables" is associated with the upper part but nothing is associated with the lower part.

FIG. 7 shows a case where roles are assigned to single keys, while FIG. 8 shows a case where a role is assigned to a double key. Since items written in a frame are identical to those for the single keys, the iterative description will be omitted.

Since the double key is wider than the single key, two frames cannot be printed side by side on the receipt paper 50. Therefore, as shown in FIG. 8, a frame acting as a key sticker 51a to be used before a role is assigned is printed in the upper part of the receipt paper, and a frame acting as a key sticker 51b to be used after the role is assigned is printed in the lower part thereof.

In the aforesaid embodiment, nothing is mentioned about the color of printed characters or the color of receipt paper. However, it is assumed in the disclosed embodiment that the color of characters is black and the color of receipt paper is white. Alternatively, any other color may be adopted for characters and/or any other colored receipt paper may be employed.

Obviously, numerous modifications and variations of the present invention are possible in light of the above teachings. It is therefore to be understood that within the scope of the appended claims, the invention may be practiced otherwise than as specifically described herein.

What is claimed is:

1. A merchandise sales data processing apparatus, comprising:
   a receipt printer for printing and issuing a receipt on receipt paper;
   means for performing merchandise sales processing that includes issuing a receipt using the receipt printer, according to received merchandise information;
   a keyboard comprising a set of keys and having a data input ability;
   a key cover that is freely attachable to or detachable from a key of the keyboard and that holds a key sheet, on which a label signifying a role of the key is printed, between the key cover and a top of the key;
   a memory unit which stores therein roles assigned to the keys; and
   printing means for controlling the receipt printer to print, on the receipt paper, a label signifying one of the roles stored in the memory unit and a frame which delineates the label as the key sheet to be held between the key cover and the top of the key, together with a numerical character specifying a position of the key.

2. The merchandise sales data processing apparatus according to claim 1, wherein the printing means controls the receipt printer to print key sheets for respective keys independently of one another.

3. The merchandise sales data processing apparatus according to claim 1, wherein the printing means controls the receipt printer to print key sheets for all of the keys to which the roles have been assigned.

4. The merchandise sales data processing apparatus according to claim 1, wherein the printing means selectively (i) controls the receipt printer to print key sheets for respective keys independently of one another, or (ii) controls the receipt printer to print key sheets for all of the keys to which the roles have been assigned.

5. The merchandise sales data processing apparatus according to claim 1, wherein sizes of the keys are stored in the memory unit, and the printing means controls the receipt printer to print the label and the frame on the receipt paper according to one of the stored sizes that corresponds to the key for which the key sheet is printed.

6. The merchandise sales data processing apparatus according to claim 2, wherein sizes of the keys are stored in the memory unit, and the printing means controls the receipt printer to print the label and the frame on the receipt paper according to one of the stored sizes that corresponds to the key for which the key sheet is being printed.

7. The merchandise sales data processing apparatus according to claim 3, wherein sizes of the keys are stored in the memory unit, and the printing means controls the receipt printer to print the label and the frame on the receipt paper according to one of the stored sizes that corresponds to the key for which the key sheet is being printed.

8. The merchandise sales data processing apparatus according to claim 4, wherein sizes of the keys are stored in the memory unit, and the printing means controls the receipt printer to print the label and the frame on the receipt paper according to one of the stored sizes that corresponds to the key for which the key sheet is being printed.

* * * * *